United States Patent [19]
Anderson et al.

[11] 3,874,736
[45] Apr. 1, 1975

[54] WELDED VEHICLE WHEEL AND METHOD OF PRODUCING SAME

[75] Inventors: Paul E. Anderson, Torrance; William W. Cunningham, Lomita; George B. Kortz, San Pedro, all of Calif.

[73] Assignee: Martin Marietta Aluminum Inc., Torrance, Calif.

[22] Filed: Dec. 27, 1972

[21] Appl. No.: 319,032

[52] U.S. Cl. ............................ 301/63 R, 301/64 SD
[51] Int. Cl. ............................................. B06b 3/00
[58] Field of Search .......... 301/63 R, 63 D, 63 PW, 301/65, 645 D, 645 R, 11 CD; 219/121 EB; 29/159.01

[56] References Cited
UNITED STATES PATENTS

| | | | |
|---|---|---|---|
| 3,459,455 | 8/1969 | Muench | 301/64 R |
| 3,527,917 | 9/1970 | Peyrot | 219/121 EM |
| 3,549,205 | 12/1970 | Reid | 301/64 |
| 3,626,140 | 12/1971 | Peyrot | 219/121 EM |

FOREIGN PATENTS OR APPLICATIONS

| | | | |
|---|---|---|---|
| 445,642 | 4/1936 | United Kingdom | 301/64 SD |
| 1,055,877 | 1/1967 | United Kingdom | 301/63 R |

*Primary Examiner*—M. Henson Wood, Jr.
*Assistant Examiner*—Reinhard J. Eisenzopf
*Attorney, Agent, or Firm*—Millen, Raptes & White

[57] ABSTRACT

A two-piece aluminum or aluminum alloy split rim vehicle wheel in which one piece thereof forms the body, a portion of the peripheral base flange and one of the rims of the wheel, while the other piece forms the remainder of the base flange and the other rim of the wheel. The two pieces are electron-beam-welded in a continuous circumferential weld between the aforesaid wheel body and corresponding base flange portions of the respective pieces.

Novel apparatus is provided to facilitate correct relative mounting of usually two pieces comprising the wheel in a separable fitting or jig upon an elevatable and rotatable support table or pedestal which is pivotally moved from an off-center loading position to a vertical, center-aligned position beneath the electron beam gun head, then elevated into sealed engagement with the vacuum chamber assembly within a welding chamber in which usually continuous welding is effected, preferably by the relatively stationary mounted electron beam generating gun or head while the pre-mounted wheel pieces are rotatably driven through a 360° travel path by an associated spindle drive device to complete the continuous weld between the two pieces. Apparatus is also provided to retract the welded wheel and to substantially simultaneously load a second pair of wheel members on a second jig and similarly operated work support pedestal or table for welding thereof while the first-mentioned welded wheel is being unloaded and reloaded for continuous and repetitive operation.

19 Claims, 21 Drawing Figures

WELDED VEHICLE WHEEL AND METHOD OF PRODUCING SAME

BACKGROUND OF THE INVENTION

This invention relates to welded vehicle wheels, and more particularly and primarily to generally two-piece split rim nonferrous welded automobile wheels, and of which the two pieces may be of dissimilar alloys, but of the same base metals. The invention further relates to novel apparatus to facilitate correct relative mounting of the composite wheel pieces for welding upon support means which are readily moveable between loading and welding and unloading positions to expedite the production rate and in a manner which produces quality products.

Vehicle wheels formed at least in part of a non-ferrous metal, e.g. aluminum or magnesium, are already known. The conventional practice is to form the center or body of the wheel from the non-ferrous material and form the rim of a steel material. To achieve this, special elements usually are incorporated into the composite wheel in order to achieve a bond between the use of ferrous and non-ferrous wheel pieces. See the following U.S. Pat. Nos. Richter 3,250,571; Walker 3,250,572; Benton et al. 3,302,273; and Stewart 3,484,137. For other U.S. patented examples of two piece wheels, see Taylor No. 3,333,319; Mayrath et al. No. 3,371,183; Holmstrom No. 3,432,207; Sutowski No. 3,446,577; Richards et al. No. 3,533,662; and Gerry No. 3,554,534.

Heretofore, the formation of a two-piece welded split rim and flange wheel has been avoided in larger automotive type wheels because of the underdeveloped state of the art in manufacturing equipment capable of making effect productive welds which would be competitive with other methods of assembly, with attendant potential risk of failure of the weld when the wheel is in use. It has now been found that a split rim type wheel can be produced by the present invention with a two-piece welded base flange which is as strong and resistant to failure at the weld by electron-beam-welding of the flange elements as described hereinafter. Electron beam welding is known to be a practical and ultra pure method of welding dissimilar alloys as well as highly oxidizable refractory metals. Such welding is often conducted in partial vacuum environment (10-300 microns) and enables both micro welds and deep penetration welds to be achieved. Such a welded wheel as evolved herein has the advantage that the same basic body member can be used to produce wheels of several different widths, thus markedly reducing production costs and inventory problems. Additional important advantages of applicants' improved split rim design include:

1. safety in event of tire failure, when the one basic piece of the wheel comprises the main body and a substantial portion of the rim flange as well as one of the rims, either the inner or outer rim;
2. stronger wheel than castings;
3. lighter weight wheel than steel wheels;
4. Availability of production electronic equipment;
5. adaptability to many different rim widths.

These are viewed quite favorably when compared to some disadvantages attendant the manufacture of the one-piece wheels which include:

1. high tooling costs for each different rim width; and
2. poor fail-safe characteristics of some drop center automotive wheel rim designs.

Applicant is aware that electron beam welding has been employed heretofore to weld together elements of brake disks pulleys, etc., such as disclosed in U.S. Pat. Nos. Buyze 3,486,218; Bragg et al. 3,512,612; and Settle 3,562,888.

SUMMARY OF THE INVENTION

The composite vehicle wheel of this invention is provided with a body and a flange with inner and outer rims for mounting a tire thereon, comprising a first member or piece from which is formed the body and a portion of the base flange, and also one of said rims; and a second piece or member which forms the remainder of said base flange and the other of said rims, which rims and flange portions are electron beam welded together near corresponding flange edges by a continuous circumferential weld, to be described in more detail hereinafter.

The apparatus which facilitates the welding of the split rim wheel comprises means for mounting the split wheel components in their correct relative positions in a support jig upon a rotatable work fixture or pedestal which is selectively elevatable and which includes means for pivotally moving it from an off-center loading position to a position aligned or centered with a welding chamber, then raising it together with a chamber-closing base plate into sealed engagement with a work chamber assembly which is a welding chamber when closed and evacuated. For the disclosed use, preferably the electron beam generating gun or head is mounted relatively stationary on the framework of a known type of electron beam welding system, such as one of the 7.5 KW Hamilton Standard PVH Series, and the rotatable work fixture supporting the mounted wheel components is then driven through a travel path of 360° to complete the aforesaid continuous weld after a predetermined degree of vacuum is effected in the chamber. The apparatus to rotate the wheel or other components which are to be welded may be disposed to rotate generally about a vertical axis in one embodiment and a horizontal axis in another embodiment. Additional means are provided whereby a second subassembly of pre-mounted wheel components is loaded and moved into position for welding by the same welding unit, substantially simultaneously during the welding retracting and unloading of the already welded first mentioned wheel. Accordingly, the apparatus is capable of near continuous use to increase production.

By the use of electron beam welding, a full depth weld of the two elements is achieved in a single pass with minimum softening of the area of the elements adjacent the weld. This permits the welding of heat-treated and machined forged aluminum, which results both in faster machining and also in better mate-up of parts for the welding step. The reduced heating effect of electron beam welding results in minimum warpage of the parts with a resultant stronger and more reliable finished wheel. The over-all result is reduced manufacturing costs for better quality products.

DETAILED DESCRIPTION OF WHEELS

Figure 1:
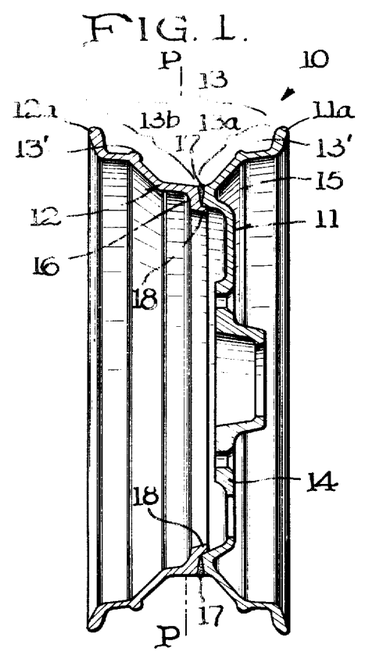
FIG. 1 is a cross-sectional view taken through one embodiment of the novel electron beam welded vehicle or industrial wheel formed of two members with split base flange and rims, and showing a generally vertical welded seam joining the formed outer wheel member with the inner wheel rim portion.

The embodiment of FIG. 1 depicts a two-piece split flange and rim type of wheel designated generally at 10 comprised of a one-piece cast or forged metal outer wheel member 11 and another one-piece inner member 12, which together form the peripheral wheel mounting base flange 13, and axially spaced outer and inner annular rims 11a and 12a, respectively. The outer wheel member 11 embodies a central body portion 14 provided with a common pattern of wheel lug mounting holes as well as the central spindle or axle mounting hole. The split flange 13 includes approximately one-half portion 13a, which is integrally formed with the one-piece outer wheel member 11, as is the outer rim 11a. The remainder of the flange is designated at 13b and is integrally cast, forged or sheet metal drawn together with the inner rim 12a. Intermediate the respective rims the flange is shown to be of a drop center type and is preferably integrally provided with annular safety beads 13', as shown. Each wheel flange portion 13a and 13b is provided with complemental annular weld faces 15 and 16 respectively, which are held in adjacently disposed relation by a suitable jig fixture and depending upon the relative size thereof may be rotated within a welding chamber about either a generally vertical axis as shown in FIGS. 11–16, or about a horizontal axis as shown in FIGS. 9, 10, 17, 18 and 19.

The disposition of the weld faces may vary relative to the major medial plane P—P (FIG. 1) of the wheel for different types of construction, as depicted in FIGS. 1–8. In the form illustrated in FIG. 1, it will be seen that the weld faces are essentially vertically disposed like the major plane P—P, and joined together by an electron beam weld seam 17 which extends circumferentially around the flange. The seam as processed by electron beam welding is of tapered cross-sectional shape. To assure that the weld is strongly made, one of the flange portions is provided adjacent the inner edge of the weld face with a generally right angular offset shoulder piece designated at 18 in FIGS. 1 and 2. The shoulder 18 assures proper indexing or alignment of the two sections of the wheel and acts as a backstop for the electron beam during welding to preclude flash splattering and pin hole formation at the back of the weld seam.

Figure 2:
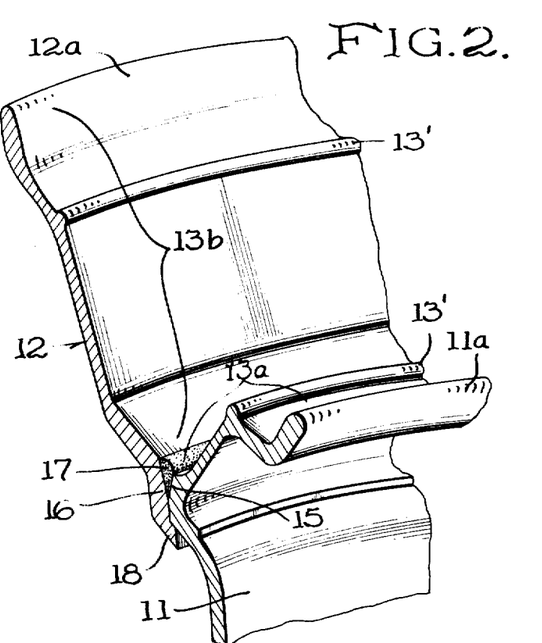
FIG. 2 is a fragmentary radial sectional view shown on an enlarged scale partially in cross-section and partially in perspective depicting in more detail the weld detail of the vehicle wheel shown in FIG. 1.

The shoulder piece 18 of the embodiment of FIGS. 1 and 2 forms the inwardmost positioned annular edge portion of the inner member 12. This edge portion abuts the first member. The weld faces extend along opposed lateral faces of the members separate from, but adjacent to the edge portion. In the embodiments of FIGS. 3A, 3B, 4A and 4B, the weld faces are also laterally disposed, but the edge portion of the inner member terminates with the edge face in direct abutment with the corresponding shoulder on the outer member 11.

Figure 3A:
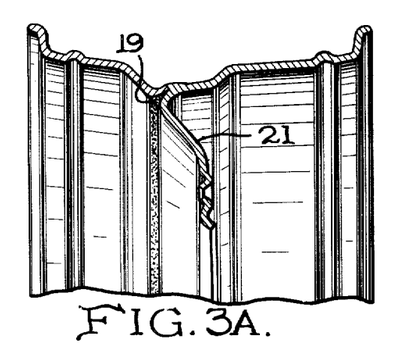
FIGS. 3A and 3B are fragmentary radial cross-sectional views of other embodiments of the novel electron beam welded wheel, wherein the respective major outer wheel portions are deep drawn and formed sheet metal in FIG. 3A and are cast or forged in FIG. 3B, and to which the respective correspondingly formed inner wheel rim portions are electron beam welded together at an angle of about 45° relative to the vertical medial plane of the wheel.
Figure 3B:
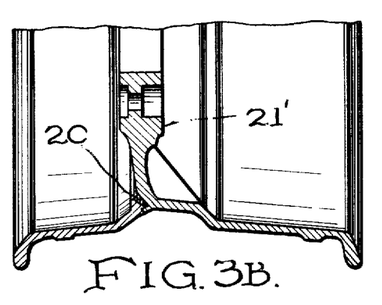

Fragmentary FIGS. 3A and 3B are fully identified in the figure description portion above as further desirable embodiments, and wherein the weld seams 19 and 20 respectively are shown disposed at an angle of approximately 45° relative to the vertical major plane of the wheels. Each of these forms is fabricated so that the major component members 21 and 21' respectively are the outer wheel members.

Figures 4A, 4B:
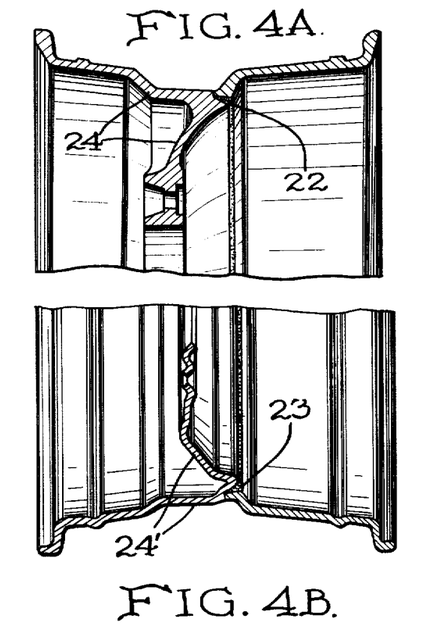
FIGS. 4A and 4B are fragmentary radial cross-sectional views of still other embodiments similar to FIGS. 3A and 3B, but wherein the respective major wheel portions form the basic inner wheel to which is welded the correspondingly formed outer wheel to which is welded the correspondingly formed outer wheel rim portions, with the weld seam disposed at an angle greater than 45° relative to the vertical medial plane of the wheel.

Fragmentary FIGS. 4A and 4B are further desirable embodiments, also described hereinabove, but in which the relative angle of the weld seams 22 and 23 is much greater and approaches a right angle relative to a vertical medial plane. In each of FIGS. 4a and 4b, the major component members 24 and 24' respectively form the inner wheel members.

Figure 5:
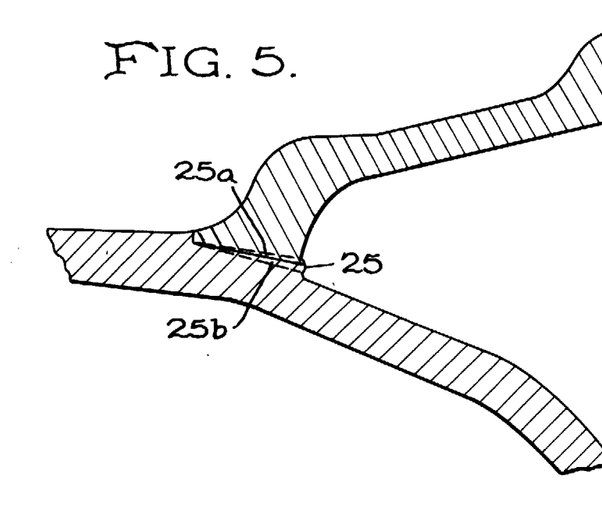
FIG. 5 is an enlarged fragmentary radial cross-sectional view showing in more detail the electron beam welded seam forming an annular straight seat and the preferred shoulder at the interface of the split wheel rim components.

In the enlarged detail of FIG. 5, the respective weld faces 25a and 25b are formed so that they contact one another when held for welding and the weld cycle puddles the metal to form a slightly tapered wedge-like bead or seam 25. The depth of weld penetration depends upon the electron beam gun focus adjustment. Electron beam welds require that the mated surfaces be under pressure for good welds, and any gap therebetween is a deterrent to forming a good weld.

Figure 6:
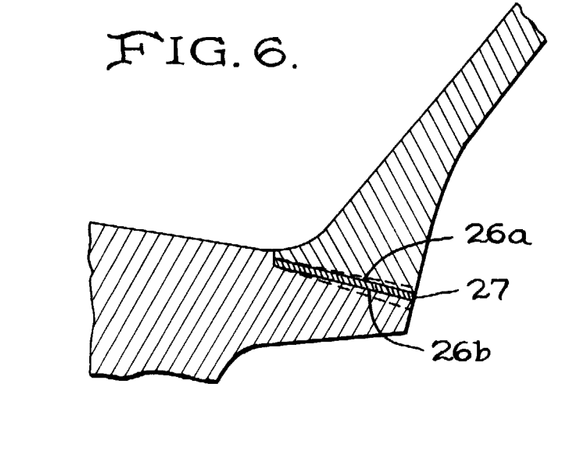
FIG. 6 is a detail view similar to FIG. 5, but showing a further embodiment prior to welding wherein an annular shim is inserted between the opposed faces to form the tapered weld seam shown in dotted lines which evolves after the electron beam welding.
Figure 7:
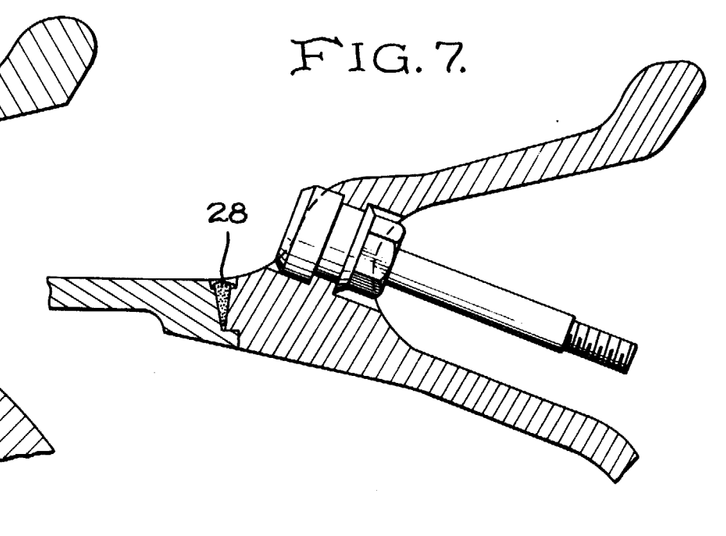
FIGS. 7 and 8 are enlarged cross-sectional details respectively showing the welded joints of two and three piece wheels.

FIG. 6 illustrates the wheel members prior to being electron beam welded together. In this embodiment, the respective member weld faces 26a and 26b are made so as to form an annular seat or space into which is inserted an annular shim 27 having a complemental cross-sectional shape corresponding to the seat or space. The metal of the shim becomes the metal of the weld. This form is especially well suited when the wheel members are formed of high strength alloy metals which are not electron beam weldable by conventional means, with the shim being of a metal composition which is compatible with the alloy metal of the respective wheel members. For instance, an essentially pure aluminum metal shim can be used where the wheel members are of high strength aluminum alloys, e.g., FIGS. 7 and 8 depict in larger detail the electron beam weld seams 28 as used for both two-piece and three-piece wheels, and for each of which seams are provided with an offset or equivalent backstop portion for the weld beam.

Figure 8:
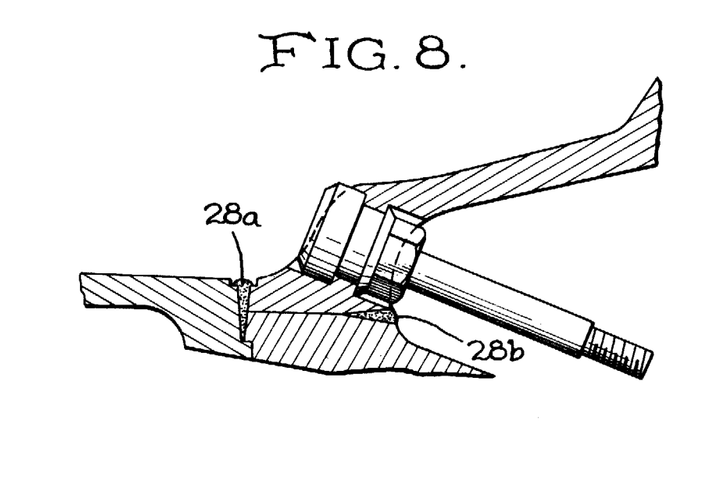

For the three-piece wheel of FIG. 8, two annular weld seams 28a and 28b are disposed at substantially right angles to one another.

APPARATUS AND METHOD FOR WELDING WHEEL MEMBERS

In addition to the improved wheel articles, this invention also contemplates an improved method for producing the wheels and novel apparatus used in conjunction with a known electron beam welder system or unit to facilitate carrying out various facets of the improved method, all of which now will be described, the apparatus being respresented in FIGS. 9-19.

Figure 9:
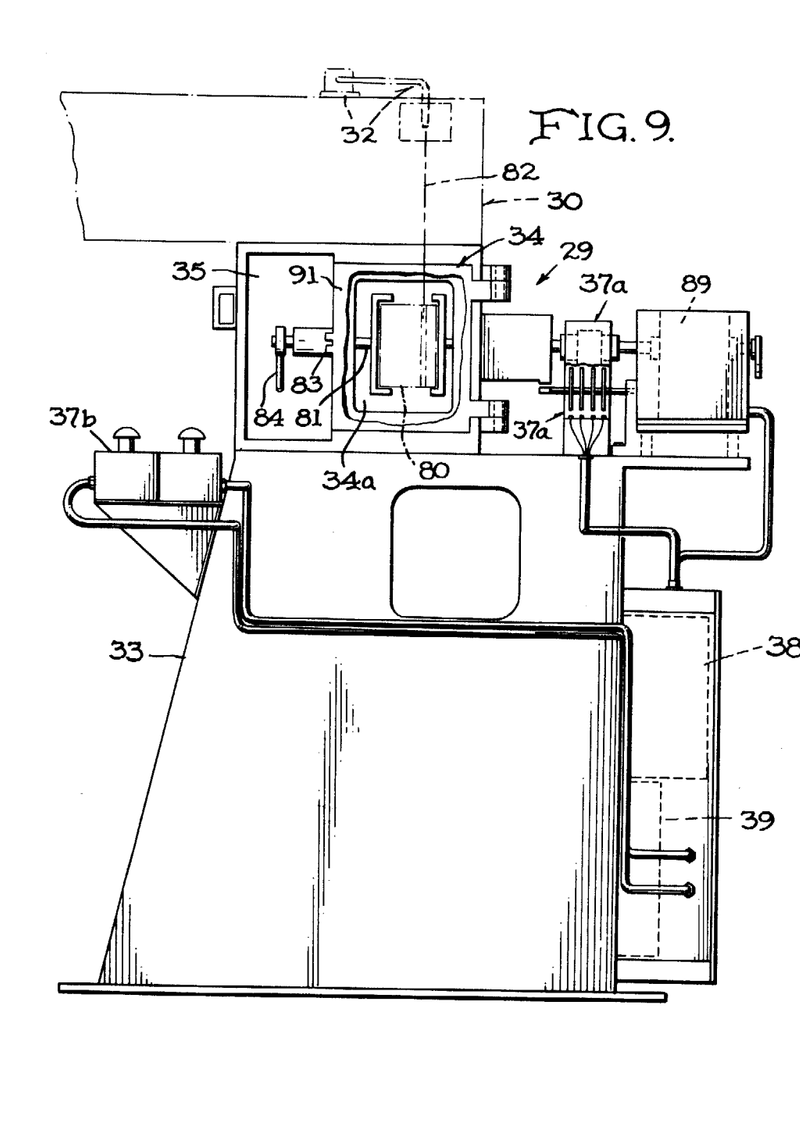
FIGS. 9 and 10 are side and end elevational views respectively of a relatively small size combined welding and vacuum chamber assembly and related apparatus for use with small size industrial wheels and special corner fittings, shown in conjunction with one end of an electron beam welder system of a known type.
Figure 10:
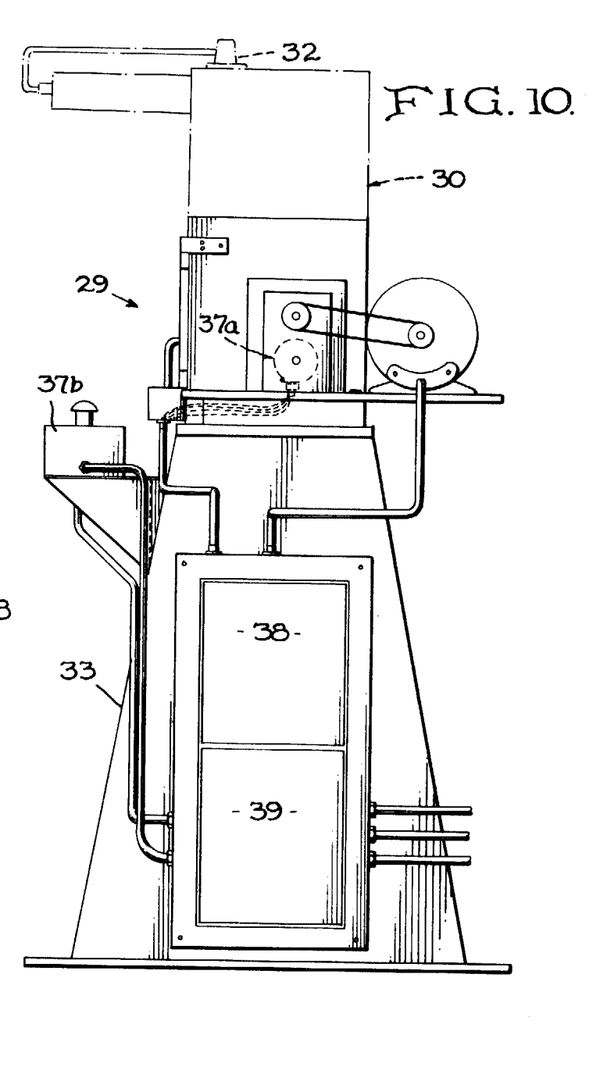

FIGS. 9 and 10 are side and end elevational views representative of a combined welding and vacuum chamber assembly 29 and related apparatus shown in conjunction with a known type of electron beam welding unit designated broadly at 30, which embodies an electron beam generating gun head 32. The assembly 29 comprises an open center support base framework 33 supporting a box-like vacuum chamber 34 having a center work portion 34a for working small sized industrial wheels or special corner fittings to be described hereinafter.

A plurality of generally rectangularly disposed walls form a pair of side by side compartments 34 and 35, of which the former generally constitutes or broadly depicts the combined welding and vacuum chamber per se, to be described in more detail hereinafter relative to FIGS. 17-19. Chamber 35 is an access chamber to the welding chamber 34 may be modified for use as a larger size welding chamber 36, shown in detail in FIG. 14, and includes an upper portion having a top wall 39 apertured at 40 through which the electron beam is projected from head 32. Chamber 36 is an open bottomed framework comprised of side wall means 41 sealingly connected with top wall 39 and terminating in an open or free lower skirt edge 42 which is periodically closed by a selectively elevatable chamber bottom closure plate or wall 43. The plate 43 is provided with a peripheral seal 44 which cooperates with the depending free skirt edge 42 to facilitate drawing at least a partial vacuum under certain welding circumstances. Suitable means such as vacuum pump means for evacuating chamber 36 are well known in the art, and are not shown herein. The vacuum chambers on production type electron beam welders are generally custom built to the particular job in order to meet the best production speeds possible, based upon pump down time requirements for a given size chamber and weld speed of approximately 100 inches per minute, which is typica. The vacuum system components are commercially available and are selected or sized for effecting the best ratio of pump down time requirements vs. cost. Usually the electron beam gun head has its own small vacuum pump assembly.

Bottom closure plate 43 also constitutes a part of a base support plate means which further includes a fixture head plate 45 of smaller area than said bottom closure plate 43 which is mounted for rotation by means of a sleeve adaptor means 72a having suitable rotor and bearing means 46 supported on the bottom closure plate 43, and to be described in more detail The wheel members to be welded are releaseably clamped to the rotatable fixture head plate 45 by clamp means 47. The clamp means 47 may be of varied form, such as shown in FIGS. 15 and 16, for different style wheels, but essentially include a first wheel member orientating ring means 48 secured to plate 45, and second wheel member retaining means including a hold down cover 49 spaced from plate 45 and adjustably connected thereto by releasable clamp levers which may comprise stud and toggle clamp sub-assemblies 50. The rotatable fixture head plate 45, of FIGS. 15 and 16, also embody suitable sleeve adaptor means 72a' corresponding to and basically the same as that denoted 72a in FIG. 14, and described further hereinafter under the heading of 'Drive Spindle Means for Rotating Mounted Wheel Members'. It is apparent that all wheels of different diameters, width and style will require tailor-made fixtures and clamping devices of the exemplified type.

ELEVATABLE WELDING CHAMBER BOTTOM CLOSURE PLATE

Figure 14:
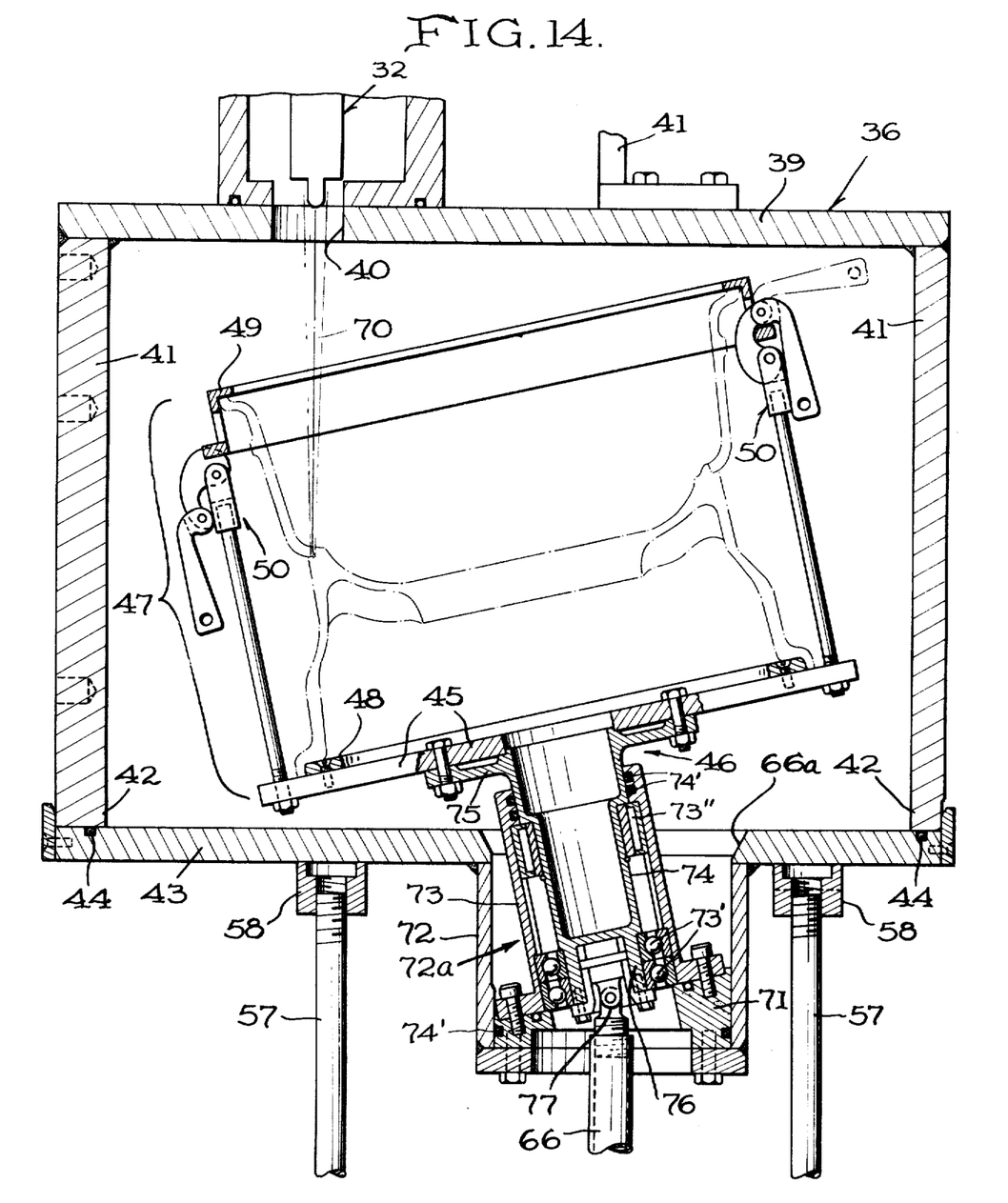
FIG. 14 is an enlarged cross-sectional view through the vacuum welding chamber of FIGS. 11 and 12 showing an operative rotary drive means for the rotating jig fixture upon which the wheel components are rotatively mounted for welding, and also illustrating therewith one form of a clamping jig fixture for mounting the wheel members.
Figure 15:
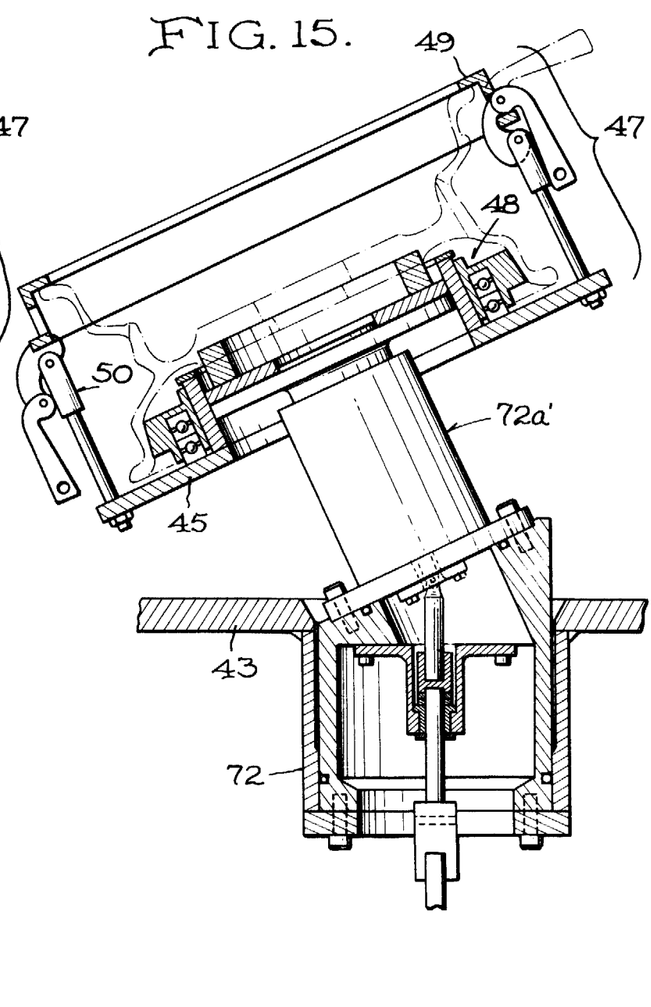
FIGS. 15 and 16 are cross-sectional views illustrative of additional tailor or custom-made clamping jigs for clamping various other two-part wheel and rim members which comprise different width and/or style wheels.
Figure 16:
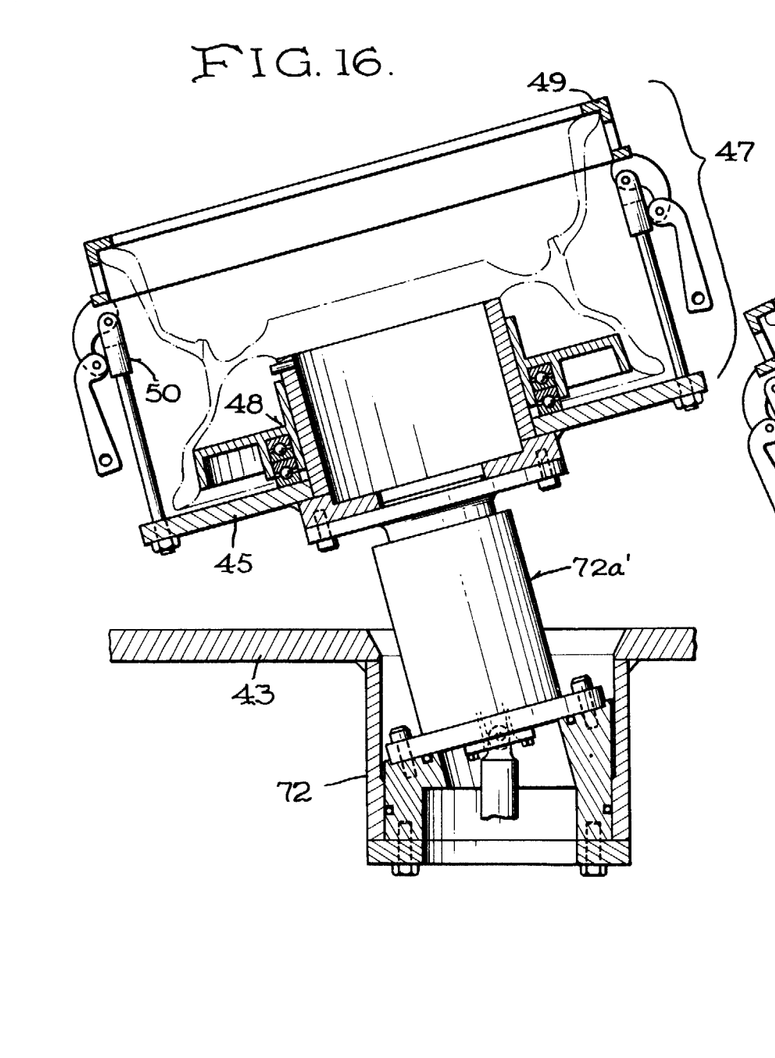

The lift means (see FIGS. 11 and 12) for periodically raising the mounted wheel members of the type depicted in FIGS. 14–16 and the associated weld chamber bottom closure plate 43 into operative welding position, is suitably disposed beneath the electron beam welding unit 30, and is designated generally at 51 and preferably includes two pair of fluid-pressure-operated cylinder and piston assemblies 52, 52. The two pair of cylinders 52 are mounted in V-shape angular relation (FIG. 12) to each other by medially interjoined connecting plates 53, the latter of which in turn is mounted pivotally at 54 between upright portions of 55 of fixed base plates 56. The cylinders have piston rods 57 which are reciprocably extensible therefrom, the outer ends of which are connected by couplings 58 to the underside of each of a pair of essentially identical chamber bottom closure plates 43.

Figure 12:
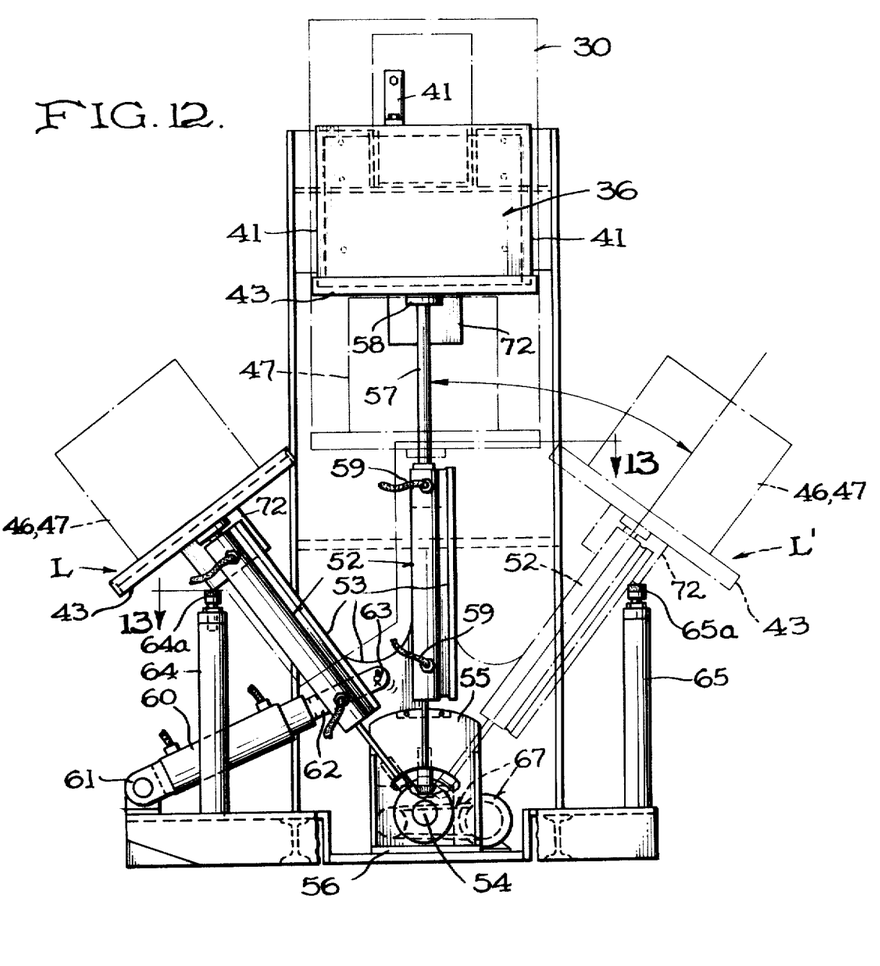

The piston rods 57 of the cylinder assemblies are selectively extended and retracted by fluid pressure introduced in a known manner via conventional fluid conduits and fittings, generally designated 59. The relative angular disposition of the dual pair cylinders 52 (FIG. 12) is such that when one pair are in vertical position with its attached bottom closure plate 43 in aligned position beneath the weld chamber, the other pair is always angularly offset at a lateral loading position L or L' (FIG. 12). To effect the pivotal movement of the respective pairs of cylinders alternately between their offset loading position and their vertically aligned elevating position, a fluid-pressure operated positioning cylinder assembly 60 has one end pivotally mounted at 61 to a fixed portion of the base frame, and the reciprocable piston rod 62 pivotally connected at 63 to an intermediate portion of cylinder connecting plate 53. Upright abutment standards 64 and 65, preferably having resilient cushioning means 64a and 65a, respectively, on their upper ends, are strategically located at laterally opposite sides of the center elevating position adjacent the opposite loading stations L and L' to resiliently cushion and support the plate 43 and related wheel member support and related rotational apparatus thereon while loading and unloading wheel members and welded wheels, respectively.

The chamber closing base plate 43 (FIG. 14) is medially apertured at 66a and is provided thereat with the rotor and bearing means 46 including a rotary drive spindle or shaft 66 having its upper end universally connected with said rotor and bearing means 46 to be described in more detail hereinafter.

DRIVE SPINDLE MEANS FOR ROTATING MOUNTED WHEEL MEMBERS

Figure 11:
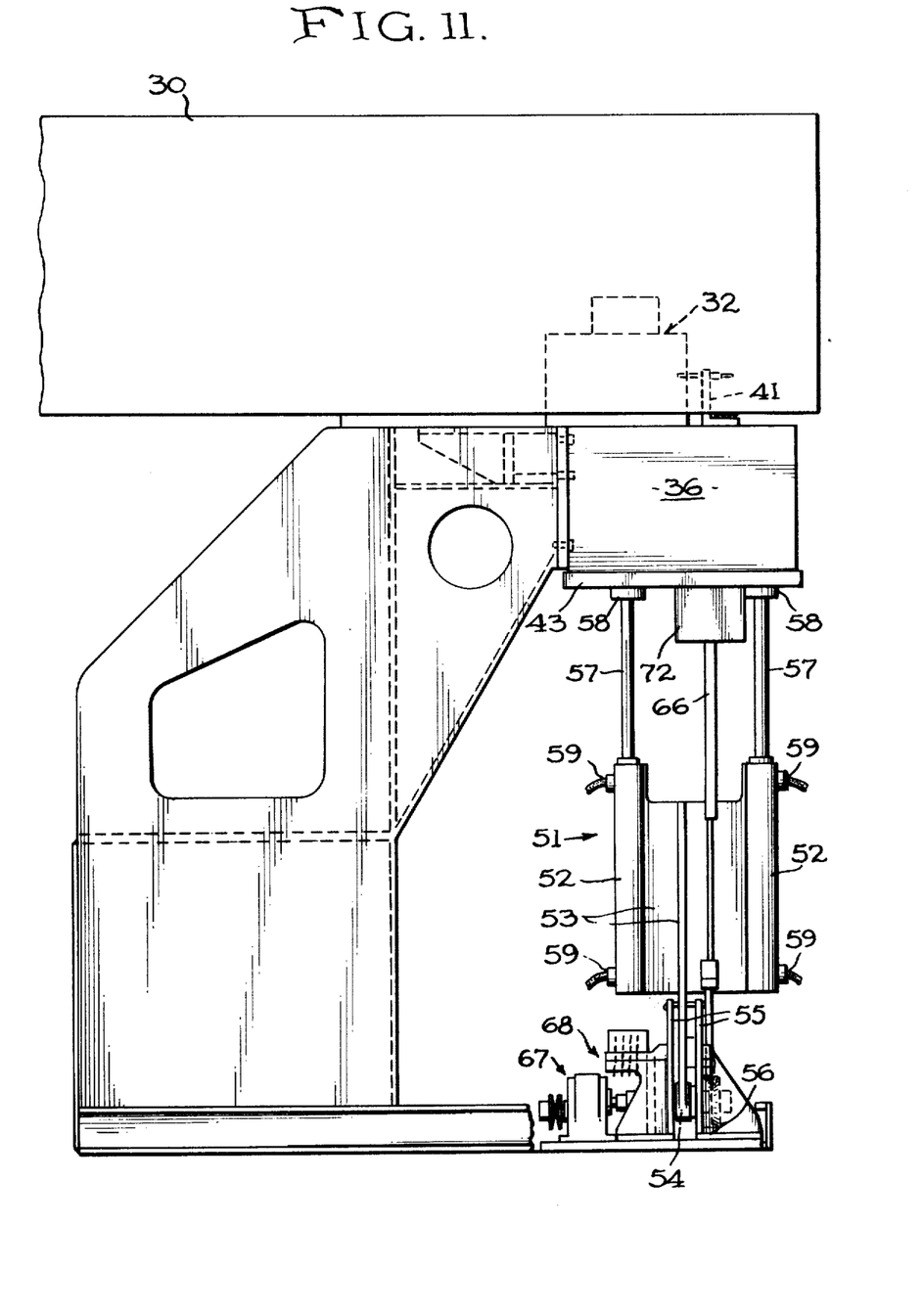
FIGS. 11 and 12 are side and end elevational views, respectively, of a pivotally mounted elevatable and rotatable work fixture or pedestal and associated rotatable drive and elevating means, shown in combination with the work vacuum chamber means of a much larger chambered sized unit for welding automotive wheels.
Figure 13:
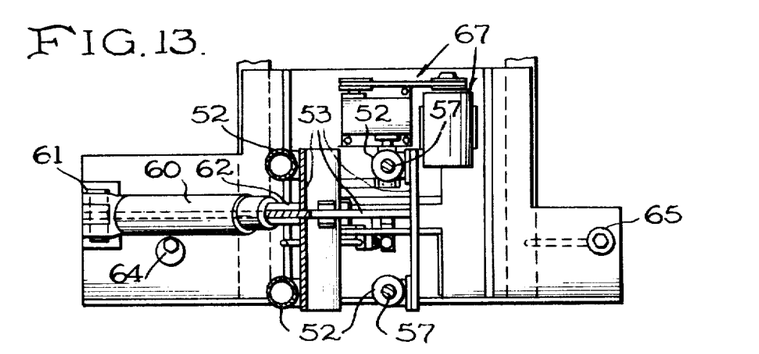
FIG. 13 is a horizontal cross-sectional detail view taken substantially on line 13—13 of FIG. 12.

The wheel members, after being mounted for welding and elevated into welding position as described hereinabove are required to be rotated through 360° about a central axis during the electron beam welding. This is achieved by a conventional drive motor via suitable gear reduction equipment together generally designated 67 (FIGS. 11, 12 and 13). A conventional horizontal output shaft therefrom interconnects with the vertical drive spindle or shaft 66 (FIG. 11) via any suitable motion transmitting means such as bevel gears. A power drive and welding cycle cam operation means 68 is operatively connected into the system including the aforestated cam control switch panel means 37 (FIGS. 9 and 10) to provide for selective predeterminable rotation of the wheel members during the actual welding cycle. The composite cam operation means 68 also may include a plurality of conventionally operable rotary cam plates (not shown) which are essentially timer periphery cam tracks with detents for activating appropriately disposed microswitches therein. It is understood that there is one track for each on-off circuit, for evacuation, rotation, weld cycle in rotational degrees, pressure release valve, etc. This type of operation is typical to all electron beam welders and other machine tools as hereinbefore mentioned relative to FIGS. 9 and 10.

It is understood relative to FIGS. 11–14, that due to the elevatable nature of the weld chamber's bottom closure plate 43 and attached wheel members, the vertical drive shaft length requirements will vary, and accordingly suitable telescopic shaft components are utilized to comprise the shaft 66. It is also understood that the larger size automotive wheels are welded in machines utilizing the vertical drive spindle, and chambers with drop-out or elevatable bottom plates, in order to achieve satisfactory hourly production rates.

Proceeding in more detail to the illustrative rotor and bearing means 46 (FIG. 14) it will be seen that where the wheel members are required to be mounted for rotation at an angle relative to the generally vertical axial path of the electron beam, designated 70, an annular angle positioning plate 71 is supported by suitable wall means 72 forming a pocket-like housing which is dependingly attached from the edge of aperture 66 on the elevatable bottom closure plate 43. The rotor and bearing means 46 further comprise a sleeve adaptor means 72a including a bearing housing 73 within which axially spaced bearings (ball bearings 73', and needle bearings 73") rotatively support a hollow spindle or rotor shaft 74. The rotor shaft 74 is provided with suitable vacuum sealing rings 74', and has an upper flange 75 for attachment to plate 45 and a terminal lower end portion 76 operatively connected via a universal type connector or joint 77 with the upper end of drive spindle 66.

Accordingly, rotation of the mounted wheel members is effected prior to the welding circuit being initiated. The mounted wheel members are preferably power rotated through the required number of degrees. Upon completion of the weld, the other of the two wheel member platforms or mounting plates 45 in its offset loading position has been loaded and readied, so that when the previously completed welded wheel is brought to rest and lowered and moved to either position L or L', as the case may be, for unloading and reloading thereof, the other already loaded assembly is elevated into welding position and the cycle is thus repeated.

Figure 17:
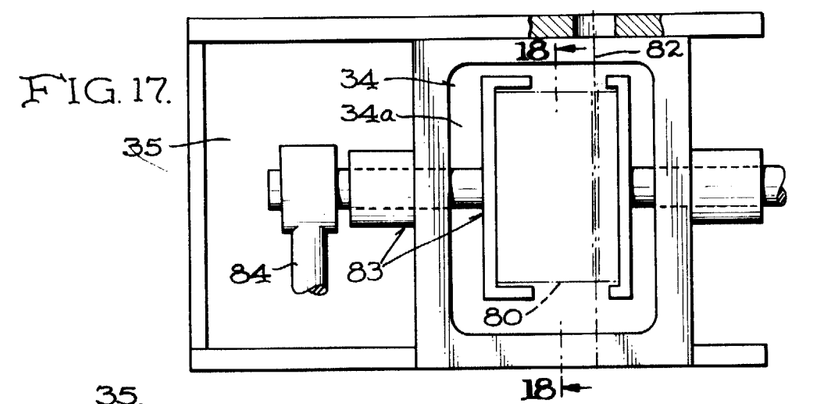
FIGS. 17 and 18 are side elevation and transverse cross-sectional views showing means for mounting a container lift corner fitting or a small size wheel member jig fitting for rotation and welding about a horizontal axis with the welding machine shown in FIGS. 9 and 10.
Figure 18:
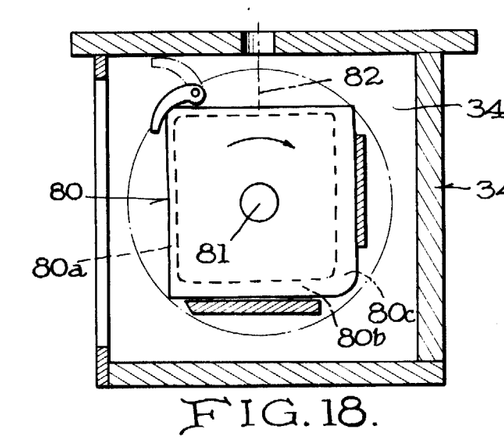
Figure 19:
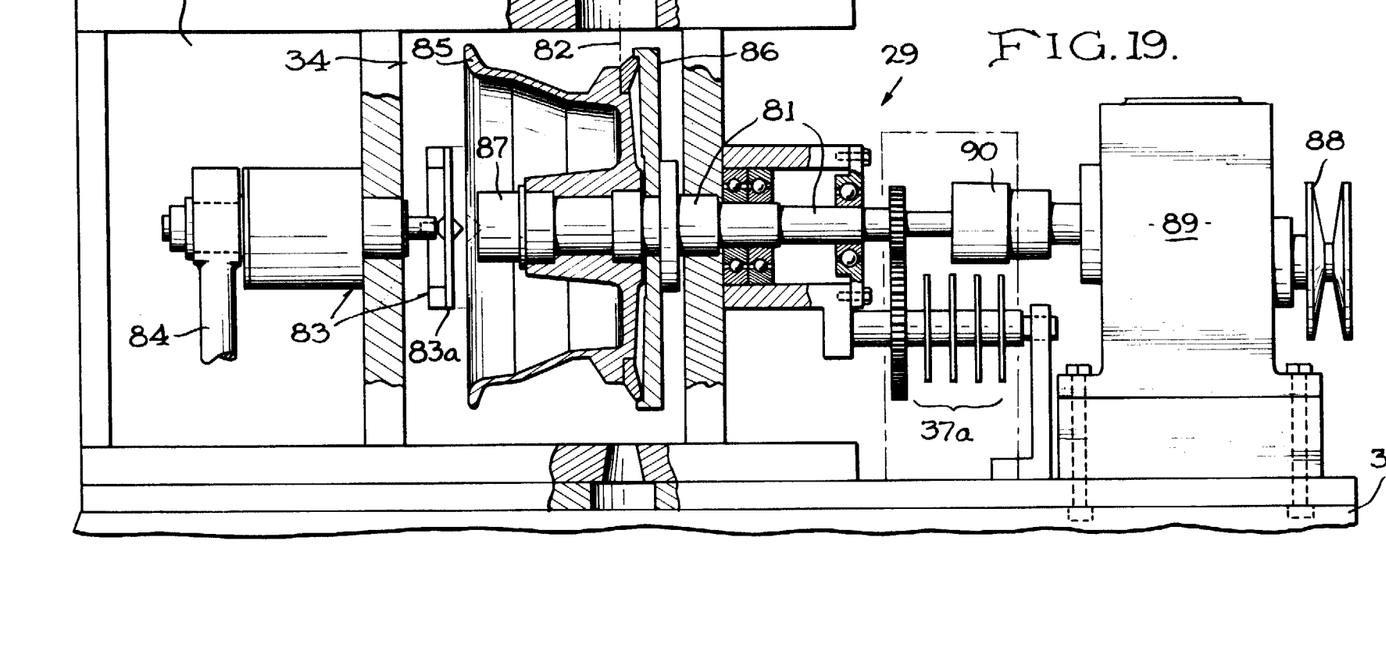
FIG. 19 is a further detailed view showing a relatively smaller sized industrial wheel disposed for rotation and welding about a horizontal axis with the welding machine shown in FIGS. 9 and 10.

Further reference is now made to the enlarged detailed showing of FIGS. 17–19 exemplifying the vacuum chamber assembly and apparatus for rotating the special fittings or clamped articles to be welded around a horizontal axis, as particularly used in conjunction with the welder and apparatus depicted in FIGS. 9 and 10. Like reference numbers for corresponding parts designated in FIGS. 9 and 10 are also used in FIGS. 17–19.

The welding chamber 34, being of a smaller size than that described relative to FIGS. 11–14, will not accommodate standard size vehicle wheels and is more particularly intended for use in electron beam welding special corner fittings 80 (FIGS. 9, 17 and 18) or for small size industrial wheels. The latter, which may range in size from 4.00/4.80 down to 2.75 × 10, can be welded with the aid of specially made spindle adaptors.

The special corner fittings 80 are used as lift fittings on various land and sea shipping containers. The corner lift fittings 80 are of two parts, welded together by means of electron beam welding which offers productively fast welding speed and the deep penetration obtainable in one pass on a 360° rotating spindle with the welding gun focus setting to accommodate the heaviest wall thickness and corner areas. As shown in FIG. 18, such fittings preferably have a light or thin wall 80a of approx. ½ inch thickness, approx. a 1 inch thick heavy wall 80b and thick corner areas 80c of 1 inch to 1 ½ thick. The rotational cycle is of approx. 16 seconds duration at a rate 100" per min. With no visual distortion and very limited annealing of the base material adjacent to the weld (FIG. 18), which with the proper base material ages partially back to the heat treated condition of the basic parts. In the present situation it was found advantageous to weld the corner fittings together by using the horizontal type spindle 81 because of the relative smallness of the part, the relation of operator handling, and the style and design of the particular electron beam gun head used therein. The centerline of the electron beam is denoted at 82. A clamp up means 83 including a clamp-up lever 84 is used to grip the corner fitting 81 during welding.

Referring to FIG. 19, the small sized wheel assembly 85 is held against a wheel nesting plate 86 by an adaptor arbor 87 slipped onto the end of the spindle 81. The arbor 87 is subsequently clamped tightly by the plate 83a of the clamp-up means 83 responsive to manual rotation of the aforementioned clamp-up lever 84. Plate 83a is depicted also in broken lines to show its clamping position. The bearing supported spindle 81 is conventionally driven by means of a belt-driven drive pulley 88 working through a suitable type gear reduction unit 89 and a coupling 90. It is understood that to enable the wheel nesting plate 86 to nestingly hold still smaller size wheel component assemblies, suitable nest plate adaptors (not shown) may be removably attached in predetermined positions upon the basic nest plate 86 to properly orient the wheel components thereon. A chamber closing door 91 (not shown in FIGS. 17–19) is shown in FIG. 9 to sealingly close the weld/vacuum chamber 34.

Because electron beam guns are very complex and expensive mechanisms, it was found to be more practical and less expensive to develop appropriate welding chambers and jig holding assemblies for use with existing and more readily available electron beam generating heads than to design mobile or adjustable gun head components, which in themselves are also quite complex and of large size. The method of rotation of any given part or parts to be welded, is determined by and dependent upon the basic design concept of the available gun and welding machine, and further by the style of the part to be welded and the desired hourly production rate.

Typical power settings which have been found very satisfactory may be on the order of 38 KV and 250 milliamps. The vacuum chamber means is capable of a pump down to 100/200 microns average. A typical rate of weld speed is approximately 100 inches per minute.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A welded two piece aluminum or aluminum alloy vehicle wheel provided with a central body and a split peripheral flange having axially spaced inner and outer continuous annular rims for mounting a tire thereon, said wheel comprised of:
   a. a first member having a portion constituting said central body and having another portion constituting an integrally formed continuous circumferential partial base flange at least part of which is offset transversely relative to a normally upright plane of said central body, said partial base flange terminating in a radially outwardly extending continuous annular rim constituting one of the aforesaid rims; said partial base flange also having an annular weld face generally at flange level position;
   b. a second member shaped to form only the remainder portion of said peripheral base flange and as well as the other continuous rim, and having an annular weld face for complemental disposition adjacent said annular weld face of said first member;
   c. said first and second members having their flange portions of predetermined lateral width, for different width wheels, and joined together at their complementally disposed flange weld faces by a substantially continuous annular tapered wedge shaped welded seam elongated in cross-section in the direction of said weld faces; and
   d. said second member having an axially inwardly positioned annular edge portion abutting said first member, said weld face of said second member extending along a lateral face of said second member separate from but adjacent to said edge portion.

2. A wheel as defined in claim 1, wherein said complemental weld faces of said split flange portions are relatively disposed to form a slightly tapered wedge shape space therebetween when viewed in radial cross-section to facilitate better reception of an electron beam doing the welding.

3. A wheel as defined in claim 1, wherein one of said wheel members is provided with a laterally offset shoulder piece for its weld face adjacent to and upon which a base portion of the other member's weld face orientatively seats thereagainst, whereby said offseat seat portion serves as an aligning means and as a backstop for electron beam welding.

4. A wheel as defined in claim 3, wherein said wheel members are formed of a high strength aluminum alloy.

5. A wheel as defined in claim 1, wherein said first and second wheel members are formed of an aluminum alloy material which is not easily electron beam weldable and said complemental weld faces of said split flange portions are fused together at the electron beam weld by means of aluminum or an electron beam weldable aluminum alloy formed from an annular shim positioned between said complemental weld faces prior to electron beam welding and of complemental cross-section thereto.

6. A wheel as defined in claim 1, wherein said two members are formed of a high strength alloy.

7. A wheel as defined in claim 1, wherein said wheel members are fabricated of deep drawn and formed sheet metal.

8. A wheel as defined in claim 1, wherein said wheel members are fabricated of cast or forged metal.

9. A wheel as defined in claim 1, wherein said split base flange portions are provided with integrally formed annular ridges directed radially outwardly sufficiently to constitute safety beads to help retain a tire on the wheel in the event of a tire blowout or failure.

10. A wheel as defined in claim 1, wherein said first member is of one predetermined shape and size to serve as a common component, and said second member has its remaining flange portion made of different predetermined lateral widths, said second members of different widths singularly welded to a given common component first member to thereby form wheels of different relative width sizes.

11. A wheel as defined in claim 1, wherein said first member constiutes a large majority and basic portion of the wheel and is of complex configuration having a plurality of compound bends or angular surfaces when viewed in radial and diameterical cross-section; and said second member constitutes a relatively minor but crucial portion of the wheel and is of relatively simple configuration as viewed in cross-section.

12. A wheel as defined in claim 11, wherein said two piece wheel members form respectively inner and outer wheel parts, of which said first member constitutes an inner basic wheel member having said central body, partial flange portion and inner rim formed integrally as one piece; and said second member constitutes the remaining partial flange portion and outer rim.

13. A wheel as defined in claim 11, wherein said two piece wheel members form respectively inner and outer wheel parts, of which said first member constitutes an outer basic wheel member having the said central body, partial flange portion and outer rim formed integrally as one piece; and said second member constitutes the remaining partial flange portion and inner rim.

14. A welded two piece aluminum or aluminum alloy vehicle wheel provided with a main central body and a split transverse peripheral flange with axially spaced inner and outer annular rims for mounting a tire thereon, said wheel comprising a first member forming said central body integrally with a portion of said split flange provided with a weld face and further including one of said rims; a second member forming the remainder of said split flange, provided with a weld face complemental to said weld face of said first member, and further including the other of said rims; said first and second members being welded together at said weld faces by a substantially continuous circumferential tapered wedge shaped weld seam elongated in cross-section in the direction of said weld faces, said second member having an axially inwardly positioned annular edge portion abuttting said first member, said weld face of said second member extending along a lateral face of said second member separate from but adjacent to said edge portion.

15. A wheel as defined in claim 14, wherein said first and second wheel members are formed of an aluminum alloy material which is not easily electron beam weldable and said complemental weld faces of said split flange portions are fused together at the electron beam weld by means of aluminum or an electron beam weldable aluminum alloy formed from an annular shim positioned between said complemental weld faces prior to electron beam welding and of complemental cross-section thereto.

16. A method of making a two-member welded wheel having a central body and split peripheral base flange and axially spaced inner and outer rim portions upon which a tire is mountable, said method comprising the steps of:
a. forming a first member to have a central body, a transversely extended continuous circumferential peripheral base flange constituting a predetermined lateral part of the overall flange width, and a radially extended continuously annular rim forming the outer terminal portion of said first member;
b. forming a second member to constitute only the remainder of said base flange and the other of said rims;
c. providing each of said members with adjacently disposed weld seam faces in complementally corresponding portions of said respective flange portions;
$c_1$. said second member being provided with an axially inwardly positioned annular edge portion abutting said frist member, said weld face of said second member extending along a lateral face of said second member separate from but adjacent to said edge portion;
d. positioning and holding said wheel members in predetermined relative assembled relationship with said weld faces disposed adjacent one another; and
e. subjecting said positioned wheel members to welding to adjoin said members in a substantially continuous annular tapered wedge shaped seam at said weld seam faces elongated in cross-section in the direction of said faces to form said wheel.

17. The method as defined in claim 16, wherein the step of paragraph (c) includes forming a generally right angular offset orientating seat or backstop portion on the weld face of one of said members adjacent a radially inward edge thereof; and the positioning step of paragraph (d) includes orientatively seating a radially inward edge of the other of said weld faces against said offset seat; said seat acting as a backstop for an electron beam during the welding step to preclude welding flash spatter and potential weld-fracturing pin holes along the remote inner portion of the weld seams.

18. The method as defined in claim 14, wherein the step of paragraph (e) includes mounting of said pre-positioned wheel members on rotatable means, holding an electron beam generating means relatively stationary, and rotating said pre-positioned and mounted wheel members about a central axis so that the generated electron beam effects a continuous circumferential weld of said wheel members.

19. The method as defined in claim 16, further including alternately and successively mounting complemental pairs of wheel members on dual mounting means, successively subjecting a first pair and then a second pair of said wheel members as mounted for alternate movement for subjecting to electron-beam-welding, of which during each successive welding the previously weld-joined wheel is unloaded and a further pair of wheel members are mounted to continue a repetitive cycle of mounting, welding and demounting.

* * * * *